June 7, 1949.  C. A. DE GIERS ET AL  2,472,249
LIQUID LEVEL MEASURING DEVICE WITH OSCILLATOR
Filed Sept. 8, 1945
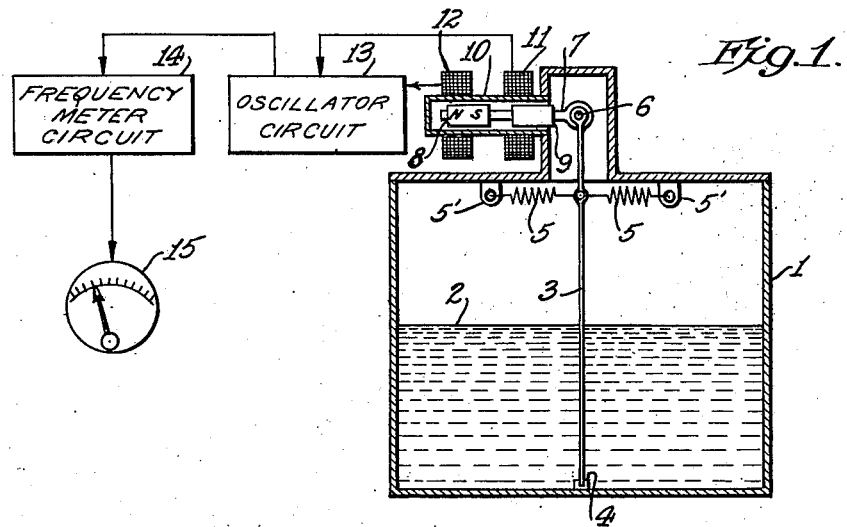
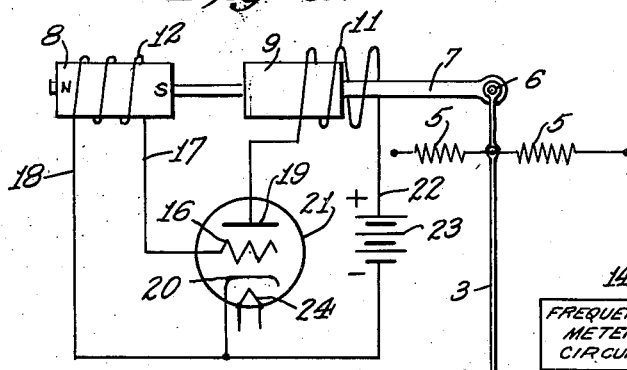
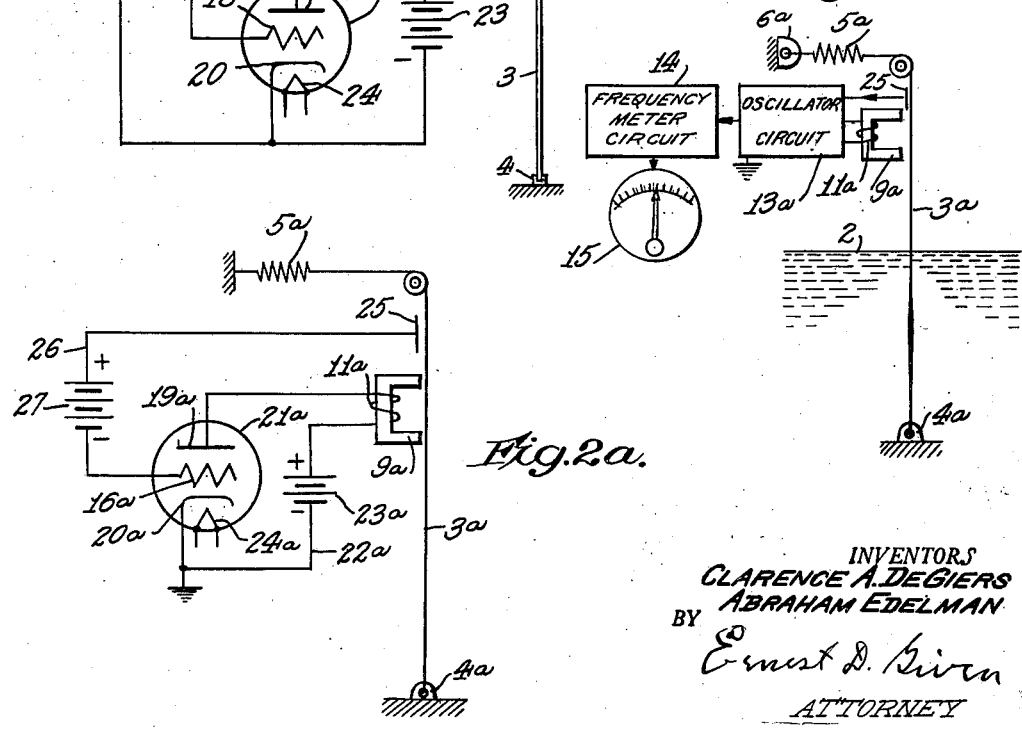
INVENTORS
CLARENCE A. DE GIERS
ABRAHAM EDELMAN
BY
Ernest D. Given
ATTORNEY Patented June 7, 1949

2,472,249

UNITED STATES PATENT OFFICE 2,472,249

LIQUID LEVEL MEASURING DEVICE WITH OSCILLATOR

Clarence A. de Giers, Forest Hills, and Abraham Edelman, New York, N. Y., assignors to The Liquidometer Corporation, Long Island City, N. Y., a corporation of Delaware Application September 8, 1945, Serial No. 615,161

8 Claims. (Cl. 73—290)

This invention relates to indicating and/or control devices for measuring liquid in a tank, particularly to telemetering devices of the electronic type including a transmitter controlled by a liquid level to be supervised and transmitting corresponding signals to a receiver.

One object of the invention is to provide a measuring device of the type described in which the transmitter of the device occupies only a comparatively small space in the liquid tank, is simple in its design and reliable in operation due to the absence of delicate parts.

Another object of the invention is a transmitter for a measuring device of the type described which does not include any parts having an appreciable friction lag such as float operated sliders.

Another object of the invention is a transmitter for a measuring device of the type described which is very sensitive to a change of the liquid level to be supervised thereby permitting a high accuracy of indication or control.

Other and further objects, features and advantages of the invention will be hereinafter set forth and the novel features thereof defined by the appended claims.

According to a now preferred embodiment of the invention the above enumerated objects of the invention, and other objects, some of which are hereinafter pointed out, are attained by providing an oscillating system including a member capable of oscillating at a natural frequency. This member is placed in the liquid the level of which is to be supervised and its oscillations are controlled by the liquid level. These oscillations in turn control the oscillations of the oscillating system which then is used to control the receiver of the measuring device.

In the accompanying drawings several embodiments of the invention are shown by way of illustration and not by way of limitation.

Fig. 1 is a diagrammatic view of a measuring device according to the invention.

Fig. 1a is a diagrammatic circuit system of an oscillator which may be used in conjunction with the measuring device according to Fig. 1.

Fig. 2 is a diagrammatic view of a modification of a measuring device according to the invention, and Fig. 2a is a diagrammatic circuit system of an oscillator which may be used in a measuring device according to Fig. 2.

Referring now to Fig. 1, this figure shows a tank or container 1 filled with liquid to the level 2. The transmitter of a measuring device according to the invention comprises a bar 3 which may be composed of metal or any other suitable material. The bar is supported at the bottom of the tank by suitable means, such as a socket 4, and is guided near its upper end by springs 5, each fastened at one end to the bar 3 and at the other end to the tank structure as at 5'. These springs urge the bar 3 into a definite position, sometimes hereinafter referred to as "central" position. Fastened to the bar 3 at point 6, at a right angle to the bar itself, is a rod 7 supporting two magnetic plungers 8 and 9. The plunger 8 is a permanent magnet having the indicated polarity, or an electromagnet, while plunger 9 is made of a ferromagnetic material having a high permeability. The plunger and the rod assembly is placed in an enclosure 10 of non-magnetic and low-conductivity material. The enclosure 10 serves as a guide for magnetic members 8 and 9 and its interior is large enough to permit oscillations of the members. A coil 11 surrounds the enclosure 10 and is so placed relative to the plunger 9 that the coil and plunger coact as a solenoid; that is, coil 11 when energized will suck member 9 into the central part of itself and release it when deenergized. Enclosure 10 is also surrounded by a second coil 12 which is placed in such relation to the permanent magnet member 8 that movements of this member will generate a voltage in coil 12. Coils 11 and 12 are connected to an oscillator circuit 13. The oscillator may be of any suitable conventional design.

Fig. 1a shows diagrammatically an oscillator circuit which is practical for use in conjunction with a measuring device according to Fig. 1. According to Fig. 1a, coil 12 is connected by leads 17 and 18 between grid 16 and cathode 20 of an electron tube 21. Coil 11 is connected by a lead 22 in series with a source of direct current such as a battery 23 between plate 19 and cathode 20 of the tube. A heater 24 for the electron tube cathode is supplied with electrical energy to maintain the required operating temperature as is well known for such tubes.

In operation, when the plate circuit is initially completed, maximum current will flow through coil 11 since there is no grid bias between grid and cathode. This current sucks plunger 9 into coil 11 thereby pulling bar 3 out of its central position and also moving magnet 8 with respect to coil 12. This latter movement generates a voltage between grid and cathode. By a proper selection of the grid-coil connections the grid voltage is caused to decrease the plate current. As a result of the decrease of the plate current the energizing current through the coil 11 will also be reduced, so that the coil diminishes its pull upon plunger 9 and the respective spring 5 will urge bar 3 back into its central position. As will be apparent, the flexible assembly composed of bar 3 and springs 5 will determine the time at which the movement of the bar away from the central position can cease and begin to reverse. As soon as the movement begins to reverse, a reversed voltage is developed by the then also reversed movement of magnet 8 relative to coil 12, and a new grid voltage is created which causes the plate current to build up quickly to its maximum value. The reestablished pull of coil 11 on plunger 9 decelerates the reversed movement of bar 3 and after a period of time which again is dependent on the spring qualities of the spring assembly the reversed movement is stopped. This cycle will then repeat itself indefinitely thereafter at a certain frequency of oscillation.

The frequency of oscillation of the entire oscillating system is determined by the natural frequency at which bar 3 vibrates. This natural frequency in turn is controlled by the dimensions and the material of the bar position, which are constant factors and also by the location of liquid level 2 relative to the bar which is a variable factor. The liquid by its inertia tends to prevent movement of that section of the bar which is immersed in liquid, or, in other words, the presence of liquid in effect shortens the natural frequency at which bar 3 will vibrate and hence also the frequency of oscillation of the entire oscillatory system.

As now will be obvious, the frequency of oscillation of the oscillating system corresponds accurately to the position of the liquid level in tank 1 and hence can be used as a measurement of the liquid level.

The system hereinbefore described constitutes the transmitter of the measuring device and is employed to transmit signals to a frequency measuring device of any suitable design and located at an observation point. Measuring device 14 serves to measure the frequency of the transmitted signals and to operate an indicating device 15 of conventional design which may be calibrated to indicate liquid height or liquid contents. It will, of course, be understood that instead of providing an indicating receiver it is also possible to provide a receiver which operates a control element such as a relay, a variable condenser, etc.

Fig. 2 shows a modified measuring device according to the invention which comprises a ferromagnetic wire 3a which is held under tension between a support 4a at the bottom of the tank (not shown) and a support 6a (which may also be fastened to the tank structure) by means of a spring 5a. A coil 11a having a U-shaped magnet core 9a is mounted adjacent to wire 3a so that the core will attract wire 3a when coil 11a is energized by current furnished from an oscillator 13a. The oscillator 13a may be of any suitable conventional type.

Fig. 2a shows diagrammatically an oscillator circuit which may be used to operate the measuring device according to Fig. 2. According to Fig. 2a, coil 11a is connected by a lead 22a in series with a battery 23a between plate 19a and cathode 20a of an electron tube 21a. A heater 24a, supplied with electrical energy in a conventional manner, is provided to maintain the required operating temperature. Metal wire 3a is grounded, as is cathode 20a, and forms one electrode of a capacitor, the second electrode of which is formed by a plate 25 connected by a lead 26 through a source of D.-C. electric energy such as a battery 27 to grid 16a. Since wire 3a and cathode 20a are at the same potential, both being grounded, the capacitor formed between electrode 25 and wire 3a is effectively connected between the grid and the cathode.

In operation, when the oscillator circuit is closed initially, maximum plate current will flow through the coil 11a thereby energizing the coil and causing wire 3a to be attracted. As wire 3a moves toward electrode 25 the capacitance to ground of electrode plate 25 is increased, thereby requiring that the potential to ground of electrode 25 and therefore the potential to ground of the grid also must change to a more negative value. This causes the plate current to be cut off thereby releasing the pull by core 9a and allowing wire 3a to move away from the core and also from electrode 25. The time required for wire 3a to reverse its movement is dependent upon its natural frequency of oscillation. When it does reverse, the capacitance to ground of electrode 25 decreases which causes the control grid of the electron tube to become more positive therefore permitting the plate current to reestablish itself. Thus, an oscillating cycle results, the frequency of which depends largely upon the natural frequency of wire 3a. The natural frequency of wire 3a is determined, as has been explained in connection with bar 3, by constant factors such as material and dimensions of the wire and by a variable factor, to wit, the location of the liquid level relative to wire 3a. Consequently, the frequency of oscillation of the oscillator system 13a is a function of the natural frequency of wire 3a which in turn is controlled by the liquid level position.

The frequency of oscillation of the oscillating system 13a is again measured by frequency measuring device 14 and indicating device 15 as has been explained in connection with Fig. 1.

While the invention has been described in detail with respect to certain particular preferred examples and embodiments it will be understood by those skilled in the art after understanding our invention that various changes and modifications may be made without departing from the spirit and scope of our invention, and it is intended therefore, in the appended claims to cover all such changes and modifications.

What is claimed is:

1. A transmitter for measuring the level of liquid in a tank, comprising an elongated member capable of oscillating at a natural frequency and extending substantially throughout the height of the liquid in the tank, means fixing one end of said member, means for resiliently supporting the other end of said member, electromagnetic means causing said member to vibrate at its natural frequency, said natural frequency varying as a function of the level of the liquid in the tank, said electro-magnetic means including a first coil having a permanent magnet armature movable therein, a second coil having an armature of magnetizable material movable therein, means for rigidly connecting said armatures to each other and for mechanically connecting said armatures to said member so that said armatures will vibrate at the frequency of said member, an oscillator alternately energized to act on said first coil and armature and de-energized by the action of said second coil and armature, and frequency measuring means for determining the vibration frequency of said member, as indicative of the liquid level to be measured.

2. Apparatus for determining the level of a predetermined liquid in a tank, comprising an elongate member having its lower end supported at the bottom of the inside of the tank and having its upper end resiliently supported at the upper portion of the tank above any expected liquid level therein, said member having a predetermined vibration frequency when so supported with the tank empty and having a variable vibration frequency when there is liquid in the tank, which frequency is a function of the level of said liquid, electrical oscillator means for mechanically oscillating said member at a frequency which is determined by the level of the liquid in the tank, and electrical means for determining the frequency of the mechanical oscillation of said member as indicative of the level of said liquid.

3. Apparatus for determining the level of a predetermined liquid in a tank, comprising a substantially rigid bar having its lower end supported inside said tank at the bottom thereof, resilient means for supporting the upper portion of said bar in the upper part of said tank above any expected liquid level therein, said bar having a predetermined vibration frequency when so supported with the tank empty and having a variable vibration frequency when there is liquid in the tank, which frequency is a function of the level of said liquid, electrical oscillator means for mechanically oscillating said bar at a frequency which is determined by the level of the liquid in the tank, and electrical means for determining the frequency of the mechanical oscillation of said bar as indicative of the level of said liquid.

4. Apparatus for determining the level of a predetermined liquid in a tank in accordance with claim 3, wherein said resilient means for supporting the upper end portion of said bar comprises a pair of tension springs connected at their adjacent ends to said bar and connected at their remote ends to points rigid with said tank, said springs being arranged substantially in alignment with one another in a direction parallel to the direction of oscillation of said bar by said electrical oscillator means.

5. Apparatus for determining the level of a predetermined liquid in a tank in accordance with claim 2, wherein said elongate member is a flexible wire, which is rigidly connected at one end to the bottom of said tank and has its other end connected through a tension spring to a point in the upper portion of said tank at a level above any expected liquid level therein.

6. A transmitter for a measuring device for measuring liquid in a tank comprising an electronic oscillating means arranged to oscillate at a given frequency when energized, an elongated member capable of oscillating at a natural frequency and mounted at one end in the tank in a position extending throughout the height thereof provided for liquid, an electro-magnetic means included in the oscillating means and arranged to cause the elongated member to oscillate, and an electric means for controlling the frequency of oscillation of the oscillating means to bring it to the natural frequency of the elongated member as affected by the liquid level, this frequency varying according to the position of the liquid level in the tank relative to the elongated member, thereby varying the frequency of oscillation of the oscillating means corresponding to a change of the liquid level to be supervised.

7. A transmitter as described in claim 6 in which the said electric control means comprises a magnetic feedback controlled by the natural frequency of the elongated member as affected by the liquid level.

8. A transmitter as described in claim 6 in which the said electric control means comprises a capacitative feed-back controlled by the natural frequency of the elongated member as affected by the liquid level.

CLARENCE A. DE GIERS.
ABRAHAM EDELMAN.

REFERENCES CITED

The following references are of record in the file of this patent:

UNITED STATES PATENTS

| Number | Name | Date |
|---|---|---|
| 1,516,947 | Beindorf | Nov. 25, 1924 |
| 2,050,674 | Stover | Aug. 11, 1936 |
| 2,280,678 | Waymouth | Apr. 21, 1942 |
| 2,306,137 | Pabst et al. | Dec. 22, 1942 |
| 2,358,374 | Ashcraft | Sept. 19, 1944 |
| 2,373,351 | Sims | Apr. 10, 1945 |
| 2,394,455 | Koch | Feb. 5, 1946 |